Apr. 24, 1923.

C. H. HAPGOOD 1,452,600

ACTUATING MEANS FOR MILKING MACHINE PULSATORS

Filed Jan. 17, 1922

WITNESS:

INVENTOR
Cyrus Howard Hapgood
BY
Frank S. Busser
ATTORNEY.

Patented Apr. 24, 1923.

1,452,600

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

ACTUATING MEANS FOR MILKING-MACHINE PULSATORS.

Application filed January 17, 1922. Serial No. 529,845.

*To all whom it may concern:*

Be it known that I, CYRUS HOWARD HAPGOOD, a citizen of the United States, residing at Nutley, county of Essex, and State of New Jersey, have invented a new and useful Improvement in Actuating Means for Milking-Machine Pulsators, of which the following is a full, clear, and exact description, reference being had to the accompanying drawings, which form a part of this specification.

My invention relates to that class of cow milking machines in which pneumatic pulsations are imparted to the pulsation chambers of double chamber teat cups. Such pulsations are produced by pulsation valves, which have been located close to the teat cups, on the milk pail, and elsewhere. Such pulsators have been operated pneumatically, electrically and mechanically.

The objection to the operation of such pulsators by electrical means is that considerable electrical energy must be provided to shift the valve from one extreme position to another. Hence, it is ordinarily preferred to actuate the valve pneumatically and to control its operation by a second valve, which may be an independently operable "master pulsator" located at a distance, or which may be a valve positioned adjacent the pulsator and operated by the pulsator valve or by an electro-magnet. There are objections to each of these systems, either with regard to expense of installation or irregularity and uncertainty of operation.

In the present invention I operate the pulsator valve pneumatically, but without the provision of any control valve, and utilize electrical energy, not to control the admission and exhaust of air to and from the valve but to restrain the pneumatic forces, which always tend to shift the valve from one position to another, from operating to shift the valve except at predetermined intervals. I accomplish this by the expenditure of comparatively little electric energy and a maximum simplicity of mechanism. My invention, more specifically expressed, comprises means whereby pneumatic forces tend, as soon as the pulsator valve is shifted to one extreme position, to return the valve to the opposite position, combined with electromagnets, each of which operates, when energized, merely to hold the valve in one extreme position, and when de-energized, to release the valve and allow the pneumatic forces to operate. It is found that but little electric energy is required to hold the valve from being shifted, in comparison with the electric energy that would be required to pull a balanced valve from one end to the other of the valve cylinder.

A preferred embodiment of the invention is shown in the accompanying drawings, in which—

Figure 1:
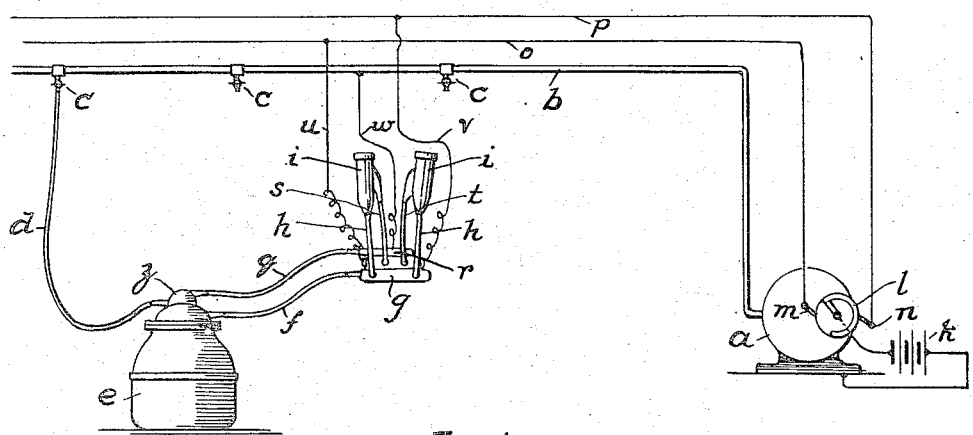
Fig. 1 is a diagrammatic view of a complete installation.

A pump $a$ exhausts air from a vacuum pipe line $b$ having cocks $c$ to which are adapted to be attached flexible pipes $d$ leading from the milk pail $e$. Preferably the pipe $d$ connects with a check valve chamber $z$ on the pail, as specifically illustrated in the Leitch Patent, No. 1,394,433, October 18, 1921. A flexible pipe $f$ connects the pail with the milk chamber $g$ of the claw. Tubes $h$ connect the milk chamber with the inner, or teat-receiving, chambers of the teat cups $i$, two only of which are shown.

An electric battery $k$ has one terminal grounded to the pipe system and the other terminal connected to a segment $l$ extending somewhat more than 180° around a commutator driven by gears from the pump $a$. Brushes $m$ and $n$ engage opposite sides of the commutator and are connected respectively to two line wires $o$ and $p$ extending adjacent and parallel to the vacuum pipe line $b$.

The claw pulsator valve $r$, mounted on the milk chamber $g$ of the claw, is provided with a vacuum port 12 located intermediate its ends, two atmosphere ports 13 and 14 located near its opposite ends, and two pairs of ports 15 and 16, the pair 15 being located between ports 12 and 13 and the pair 16 being located between ports 12 and 14.

The port 12 is connected, by means of a flexible tube $q$, with the chamber $z$ of the pail $e$, which is connected with the source of vacuum through pipes $d$ and $b$. Ports 15 and 16 are connected, by means of pairs of tubes $s$ and $t$, with the teat cups; one pair of tubes $s$ being connected with the outer, or pulsation, chambers of one pair of teat cups, and the other pair of tubes $t$ being connected with the corresponding chambers of the other pair of teat cups. I provide this arrangement of ports and tubes to adapt my invention to the "alternate system" of pulsation; that is, that system wherein two of the pulsation chambers are subjected to relatively high pressure (e. g., atmosphere) at the time that the other two pulsation chambers are subjected to relatively low pressure (e. g., partial vacuum). In case it be desired to impart like pulsations simultaneously to all four teat cups, the described arrangement is capable of obvious simplification.

In the valve cylinder heads are two electro-magnets 17 and 18, each with one terminal grounded on the valve body and the other connected with one of the branch wires $u$ and $v$ connected respectively with the line wires $o$ and $p$. A wire $w$ connects the valve body with the vacuum pipe line $b$.

Inside the valve cylinder is a piston valve 19 having two circumferential grooves 20 and 21. Holes 22 and 23 in the piston connect the respective grooves with the respectively adjacent ends of the cylinder.

From the foregoing description of the electric devices, it will be understood that the magnets 17 and 18 will be energized alternately but that each magnet will be energized for a short period before the other is de-energized. That is, magnet 17 will be energized, then magnet 18 de-energized, then magnet 18 energized, then magnet 17 de-energized, then magnet 17 energized and so on. These magnets, however, are not sufficiently strong to shift the valve.

Figure 2:
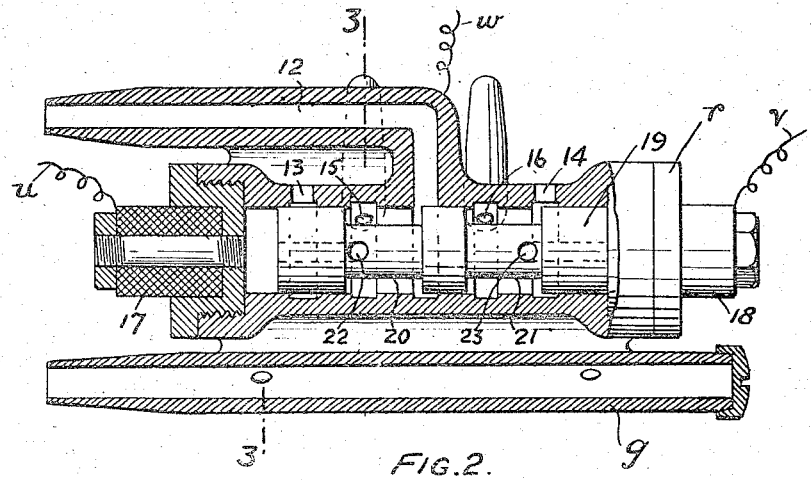
Fig. 2 is a longitudinal sectional view of the new pulsator.
Figure 3:
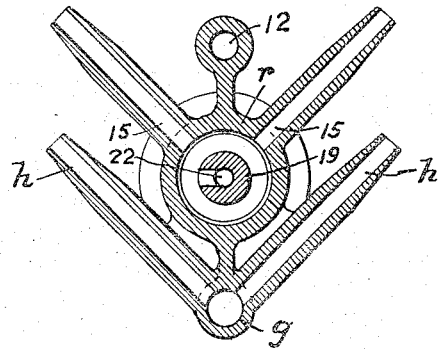
Fig. 3 is a cross-section on the offset line 3—3 of Fig. 2.

With the valve in the position shown in Fig. 2 atmospheric pressure is communicated, by the port 14, groove 21 and hole 23, to the right hand end of the valve cylinder, while air is exhausted, by the port 12, groove 20 and hole 22, from the left hand end of the valve cylinder, thereby tending to move the piston to the left. However, at this time the magnet 18 is being energized and the magnet is sufficiently strong to hold the piston to the right, even after magnet 17 is energized. As soon, however, as magnet 18 is de-energized, the pneumatic forces move the piston to the left. Atmospheric pressure is then communicated to the left hand end of the cylinder through port 13, groove 20 and hole 22, while the right hand end of the cylinder is subjected to suction through hole 23, groove 21 and port 12. The pneumatic forces, therefore, tend to immediately return the piston to the right, but magnet 17, which, before the shift from right to left, had been energized, is sufficiently strong to hold the piston to the left. As soon, however, as magnet 17 is de-energized, the piston shifts to the right.

It will be readily understood that, when the valve is in its left hand position, air is admitted, through port 13, groove 20 and port 15 to the pulsation chambers of one pair of teat cups, while air is exhausted, through port 16, groove 21 and port 12, from the pulsation chambers of the other pair of teat cups; while when the valve has been shifted to the right, the connections from the two pairs of pulsation chambers to atmosphere and vacuum are reversed.

As hereinbefore stated, because the magnets are not relied upon to move the valve piston, but only to hold it at a point where there need be no air gap in the magnetic circuit, very small magnets can resist pneumatic forces much greater than that required to move the piston, and much smaller magnets may be used than if electro-magnetic means were relied upon to effect the shift.

It will thus be seen that I have provided pneumatic forces of considerable magnitude to shift the valve and means whereby a very small electric current may prevent such shift.

It will also be clear, when the holding magnet is de-energized, the shift of the valve will be quick and that the valve may be held in its shifted position for an exact predetermined period of time, so that at all times the action of the pulsator will be regular and certain.

Except where specifically claimed, the invention is not limited in its application to double-chamber teat cups, nor to the alternate system of milking. It is clear, also, that the pulsator valve need not be a claw pulsator, but might be located, for example, on the milk pail, which would necessitate no change in connections. Nor is the invention limited to any described details except where they are specifically included in the claims. It will also be understood that while, by high pressure and low pressure, I mean to cover atmospheric pressure and a partial vacuum, I mean also to include any two different degrees of absolute pressure.

Having now fully described my invention, what I claim and desire to protect by Letters Patent is:

1. In a milking machine, the combination with the teat cups, of a pulsator valve adapted in its reciprocations to produce pulsations in the teat cups, means whereby pneumatic forces tend to shift the valve, and electro-magnetic means adapted to resist such forces until a predetermined instant.

2. In a milking machine, the combination with the teat cups, of a pulsator valve adapted in its reciprocations to produce pulsations in the teat cups, means whereby pneumatic forces tend, when the valve is in either position, to shift it toward the other position, electro-magnets adapted when energized to hold the valve, against said pneumatic forces, in its opposite positions, and means to energize each magnet before the valve is shifted toward it and to de-energize such magnet after the valve is shifted toward it to allow the pneumatic forces to shift the valve back.

3. In a milking machine, the combination with the teat cups, of a pulsator valve adapted in its reciprocations to produce pulsations in the teat cups, means whereby pneumatic forces tend, when the valve is in either position, to shift it toward the other position, electro-magnets adapted when energized to hold the valve in its opposite positions against the pneumatic forces tending to shift it, and means to alternately energize and de-energize each magnet and to energize each magnet before the other is de-energized.

4. In a milking machine, the combination with the teat cups, of a pulsator valve adapted in its reciprocations to produce pulsations in the teat cups, means whereby pneumatic forces tend, when the valve is in either position, to shift it toward the other position, electro-magnets adapted when energized to hold the valve in its opposite positions against the pneumatic forces tending to shift it, and means to alternately energize and de-energize each magnet and to energize each magnet before the valve completes its shift consequent upon its release due to the de-energizing of the other magnet.

In testimony of which invention, I have hereunto set my hand, at New York, on this 13th day of January, 1922.

CYRUS HOWARD HAPGOOD.

Witnesses:
  GEO. I. TALLMAN,
  S. E. BARNES.